(12) United States Patent
Fukuda (10) Patent No.: US 10,830,291 B2
(45) Date of Patent: Nov. 10, 2020

(54) TRANSAXLE

(71) Applicant: KANZAKI KOKYUKOKI MFG. CO., LTD., Amagasaki (JP)

(72) Inventor: Toshiyuki Fukuda, Morristown, TN (US)

(73) Assignee: KANZAKI KOKYUKOKI MFG. CO., LTD., Amagasaki (JP)

( * ) Notice: Subject to any disclaimer, the term of this patent is extended or adjusted under 35 U.S.C. 154(b) by 205 days.

(21) Appl. No.: 15/938,295

(22) Filed: Mar. 28, 2018

(65) Prior Publication Data

US 2018/0283472 A1 Oct. 4, 2018

Related U.S. Application Data

(60) Provisional application No. 62/477,749, filed on Mar. 28, 2017.

(51) Int. Cl.
*F16D 41/08* (2006.01)
*B60K 23/08* (2006.01)
(Continued)

(52) U.S. Cl.
CPC .......... *F16D 41/088* (2013.01); *B60K 17/344* (2013.01); *B60K 23/08* (2013.01); *F16D 7/048* (2013.01); *F16D 27/112* (2013.01); *F16D 28/00* (2013.01); *F16D 41/067* (2013.01); *F16H 48/08* (2013.01); *F16H 48/16* (2013.01); *F16H 48/42* (2013.01); *B60K 17/02* (2013.01);

(Continued)

(58) Field of Classification Search
None
See application file for complete search history.

(56) References Cited

U.S. PATENT DOCUMENTS 4,597,467 A * 7/1986 Stockton ............ B60K 17/3505
180/233
7,938,041 B1 5/2011 Shiigi et al.
(Continued)

FOREIGN PATENT DOCUMENTS

JP 2952731 * 9/2015

*Primary Examiner* — Mark A Manley
(74) *Attorney, Agent, or Firm* — Cantor Colburn LLP (57) ABSTRACT

A transaxle according to the present application may include: a transaxle case; an input member supported within the transaxle case; a gear drivingly connected to the input member within the transaxle case; an output member which is supported within the transaxle case and arranged at the inner peripheral side of the gear concentrically with the gear; a cage with a roller as a bidirectional overrunning clutch interposed between the inner periphery of the gear and the outer periphery of the output member within the transaxle case; and a drag mechanism provided within the transaxle case to apply rotational resistance to the cage to make the bidirectional overrunning clutch be engaged. The cage has a first end and a second end, which oppose each other in an axial direction of the output member. The first end of the cage is close to a first bearing which pivotally supports the output member to the transaxle case. The drag mechanism has a rotation member which is locked to the cage at the first end of the cage so as to be relatively non-rotatable, and a spring member for applying the rotational resistance to the rotation member.

3 Claims, 7 Drawing Sheets (51) Int. Cl.
    *F16D 28/00*     (2006.01)
    *B60K 17/344*    (2006.01)
    *F16D 41/067*    (2006.01)
    *F16H 48/16*     (2006.01)
    *F16D 7/04*      (2006.01)
    *F16H 48/08*     (2006.01)
    *F16H 48/42*     (2012.01)
    *F16D 27/11*     (2006.01)
    *F16D 3/227*     (2006.01)
    *F16D 27/112*    (2006.01)
    *B60K 17/02*     (2006.01)

(52) U.S. Cl.
    CPC ......... *B60Y 2400/427* (2013.01); *F16D 3/227* (2013.01); *F16H 2048/087* (2013.01); *F16H 2048/423* (2013.01)

(56) References Cited

U.S. PATENT DOCUMENTS

| | | | |
|---|---|---|---|
| 8,312,792 B1* | 11/2012 | Kochidomari | F16D 27/10 411/113 |
| 2014/0274530 A1* | 9/2014 | Knickerbocker | B60W 10/12 475/150 |
| 2015/0159743 A1* | 6/2015 | Palmer | F16D 41/088 74/650 |
| 2016/0108976 A1* | 4/2016 | Lawrence | F16D 27/10 192/40 |

* cited by examiner

TRANSAXLE

CROSS-REFERENCE TO RELATED APPLICATIONS

The present invention claims priority under 35 U.S.C. § 119 to U.S. Provisional Application No. 62/477,749, filed on Mar. 28, 2017, the entire disclosure of which is incorporated herein by reference.

FIELD

At least one embodiment of the present invention relates to a transaxle provided with a bidirectional overrunning clutch.

BACKGROUND

Conventionally, for example, as disclosed in U.S. Pat. No. 7,938,041 B1, a transaxle, which is used as a front-wheel transaxle of a four-wheel drive vehicle and provided with a bidirectional overrunning clutch, has been known.

This transaxle supports a pair of coaxial right and left spools (output members) and an input shaft having an axial center in a direction perpendicular to the spools in a transaxle case. In the transaxle case, a large-diameter bevel gear arranged around both spools is geared with a bevel gear on the input shaft. A cage which holds a roller as the bidirectional overrunning clutch (a cage holding a roller is referred to as a "roller cage") is interposed between the inner periphery of the large-diameter bevel gear and the outer peripheral surfaces of both of the spools. The spools are respectively fitted onto the outer peripheries of a pair of right and left axles of a vehicle provided with the transaxle so as to be relatively non-rotatable.

For example, if the rotation number of the output shaft side is higher than the rotation number of the input shaft when the front wheels are rotated from the ground, the bidirectional overrunning clutch is disengaged, the transmission of power from the input shaft to the output shaft is blocked, and the vehicle becomes two-wheel drive. In a case of traveling on a rough road, if the wheels slip and the rotation number of the output shaft side becomes lower than the rotation number of the input shaft, the bidirectional overrunning clutch is engaged, power is transmitted from the input shaft to the axle, and the vehicle becomes four-wheel drive.

A drag mechanism for dragging the roller cage to the spools according to a decrease in the rotational speed of the spools which rotate together with the axle is provided at one end of both ends (right and left ends) of the roller cage in the axial direction. The drag mechanism has a rotation member which rotates together with the cage, a friction member which is locked to a part of the transaxle case and whose rotation is limited, and a spring which presses the friction member against the rotation member. A frictional force acting as a rotational resistance of the rotation member is generated by the pressing force of the spring, thereby dragging the roller cage to the spools according to a decrease in the rotational speed of the spools so that the bidirectional overrunning clutch can be engaged.

Note that a solenoid switch for always setting the vehicle in a two-wheel drive state (i.e., a state in which the bidirectional overrunning clutch is always disengaged regardless of a decrease in the rotational speed of the axle) is attached to the transaxle case in the transaxle disclosed in the aforementioned publication. By limiting the rotation of the friction member with this solenoid switch, the bidirectional overrunning clutch can be engaged according to a decrease in the rotational speed of the axle as previously mentioned. On the other hand, by switching the solenoid switch to a state where the rotation of the friction member is not limited, the friction member is co-rotated by the rotation member, and the friction member does not become the rotational resistance of the rotation member. Thus, the roller cage idles between the large-diameter bevel gear and both spools at any rotational speed of the spools, and the vehicle can be always in a two-wheel drive state.

However, since the conventional drag mechanism is provided around one spool in a gap space between a bearing, which supports the one spool to the transaxle case, and one end of the roller cage in the axial direction, the entire bidirectional overrunning clutch including the drag mechanism is lengthened in the axial direction of the spools (and the axle) as the output members of the transaxle, and this disturbs the downsizing of the entire transaxle.

SUMMARY

A transaxle according to the present application includes: a transaxle case; an input member supported within the transaxle case; a gear drivingly connected to the input member within the transaxle case; an output member supported within the transaxle case and arranged on an inner peripheral side of the gear concentrically with the gear; a cage with a roller as a bidirectional overrunning clutch interposed between an inner periphery of the gear and an outer periphery of the output member within the transaxle case; and a drag mechanism provided within the transaxle case and structured to apply rotational resistance to the cage to make the bidirectional overrunning clutch be engaged. The cage has a first end and a second end, which oppose each other in an axial direction of the output member. The first end of the cage is close to a first bearing which pivotally supports the output member to the transaxle case. The second end of the cage is close to a second bearing which is arranged on a side opposite to the first bearing in the axial direction and pivotally supports the output member to the transaxle case. The drag mechanism has a rotation member which is locked to the cage at the first end of the cage so as to be relatively non-rotatable, and a spring member structured to apply the rotational resistance to the rotation member. In the transaxle case, a first concave space is formed in an inner wall of the transaxle case that supports an outer race of the first bearing and an outer race of the second bearing, and the spring member is disposed in the first concave space.

As described above, since the drag mechanism has the spring member arranged in the space on the outer periphery of the boss which holds the outer race of the first bearing in a radial direction with the axial center of the output member as the center, the first end of the cage is disposed close to the first bearing. Thus, the transaxle is shortened in the axial direction of the output member and downsized.

Preferably, in the transaxle, the rotation member of the drag mechanism is a holder having an annular groove opened outward in the radial direction. In the annular groove, the spring member and a resistance member pressed against the holder by the spring member are disposed. A rotation limiting member is fixed to the transaxle case. A frictional force generated between the resistance member and the holder becomes the rotational resistance by rotating the holder together with the cage while the rotation of the resistance member is limited by the rotation limiting member.

With the above configuration, the placement position of the spring member is secured on the outer side in the radial direction of the first bearing. Moreover, since the rotation member locked to the cage so as to be relatively non-rotatable serves also as the holder which holds the spring member and the resistance member in the annular groove, the number of parts can be reduced, leading to cost reduction.

Preferably, in the transaxle, the second end of the cage is close to a second bearing which is arranged on a side opposite to the first bearing in the axial direction and pivotally supports the output member to the transaxle case. In the transaxle case, a wedging prevention mechanism for applying an urging force for restoring the engaged bidirectional overrunning clutch to be disengaged is disposed. The wedging prevention mechanism has a second rotation member and a second spring member. The second rotation member is locked to the cage at the second end of the cage so as to be relatively non-rotatable. The second spring member applies the urging force to the second rotation member. In the transaxle case, a second concave space is formed in the inner wall that supports the outer race of the first bearing and the outer race of the second bearing, and the second spring member is disposed in the second concave space.

As described above, in addition to the drag mechanism, since the wedging prevention mechanism has the spring member arranged in the space on the outer periphery of the boss which holds the outer race of the second bearing in the radial direction with the axial center of the output member as the center, the second end of the cage is disposed close to the second bearing. Thus, the transaxle is further shortened in the axial direction of the output member and downsized.

The above and other features and effects of some embodiments of the present application will become more apparent from the following detailed description with reference to the accompanying drawings.

DETAILED DESCRIPTION

A first embodiment of a transaxle 1 will be described with reference to FIGS. 1 to 5B. Note that, herein, front, rear, right and left directions are set in consideration of a case where the transaxle 1 is provided as a front-wheel transaxle of a vehicle, and an arrow F indicates the front direction in FIGS. 1 and 2, but use of the transaxle 1 is not limited to such orientation.

A transaxle case 2 is constituted by combining and joining a main housing 21, a side housing 22 and a rear housing 23. One of the right and left sides of the front portion of the main housing 21 is open, and the side housing 22 is bolted to the main housing 21 so as to cover the opening at the one of the right and left sides. The rear end of the main housing 21 is open, and the rear housing 23 is bolted to the main housing 21 so as to cover this opening at the rear end.

An input shaft 3 in the front-rear horizontal direction, which serves as an input member of the transaxle 1, is pivotally supported by the rear housing 23 through a bearing 31 at the rear side and by the main housing 21 through a bearing 32 at the front side. A bevel pinion (bevel gear) 3a is formed at the front end of the input shaft 3.

An inner boss 22a and an outer boss 22b are concentrically formed in the side housing 22. A first axle 81 (see FIG. 1) and a first spool 71 are inserted into the inner boss 22a. The first axle 81 has an axial center in the right-left horizontal direction perpendicular to the input shaft 3, and the inner periphery of the first spool 71 is engaged with the outer periphery of the first axle 81 by spline fitting so as to be relatively non-rotatable. The inner race of a ball bearing as a bearing 35 abuts the outer peripheral surface of the first spool 71, and the outer race abuts the inner periphery of the inner boss 22a of the side housing 22 so that the first spool 71 is pivotally supported by the side housing 22 through the bearing 35.

An inner boss 21a and an outer boss 21b are concentrically formed at the front portion of the main housing 21 on a side opposite to the side housing 22 in the right-left direction. A second axle 82 (see FIG. 1) and a second spool 72 are inserted into the inner boss 21a. The inner periphery of the second spool 72 is engaged with the outer periphery of the second axle 82 by spline fitting so as to be relatively non-rotatable. The inner race of a ball bearing as a bearing 36 abuts the outer peripheral surface of the second spool 72, and the outer race abuts the inner periphery of the inner boss 21a of the main housing 21 so that the second spool 72 is pivotally supported by the main housing 21 through the bearing 36.

FIGS. 2, 3 and 4A to 5B show the transaxle 1 without the first and second axles 81 and 82. The first and second spools 71 and 72 as the output members of the transaxle 1 are pivotally supported by the main housing 21 and the side housing 22 of the transaxle case 2 through the bearings 35 and 36 even without the first and second axles 81 and 82.

Figure 1:
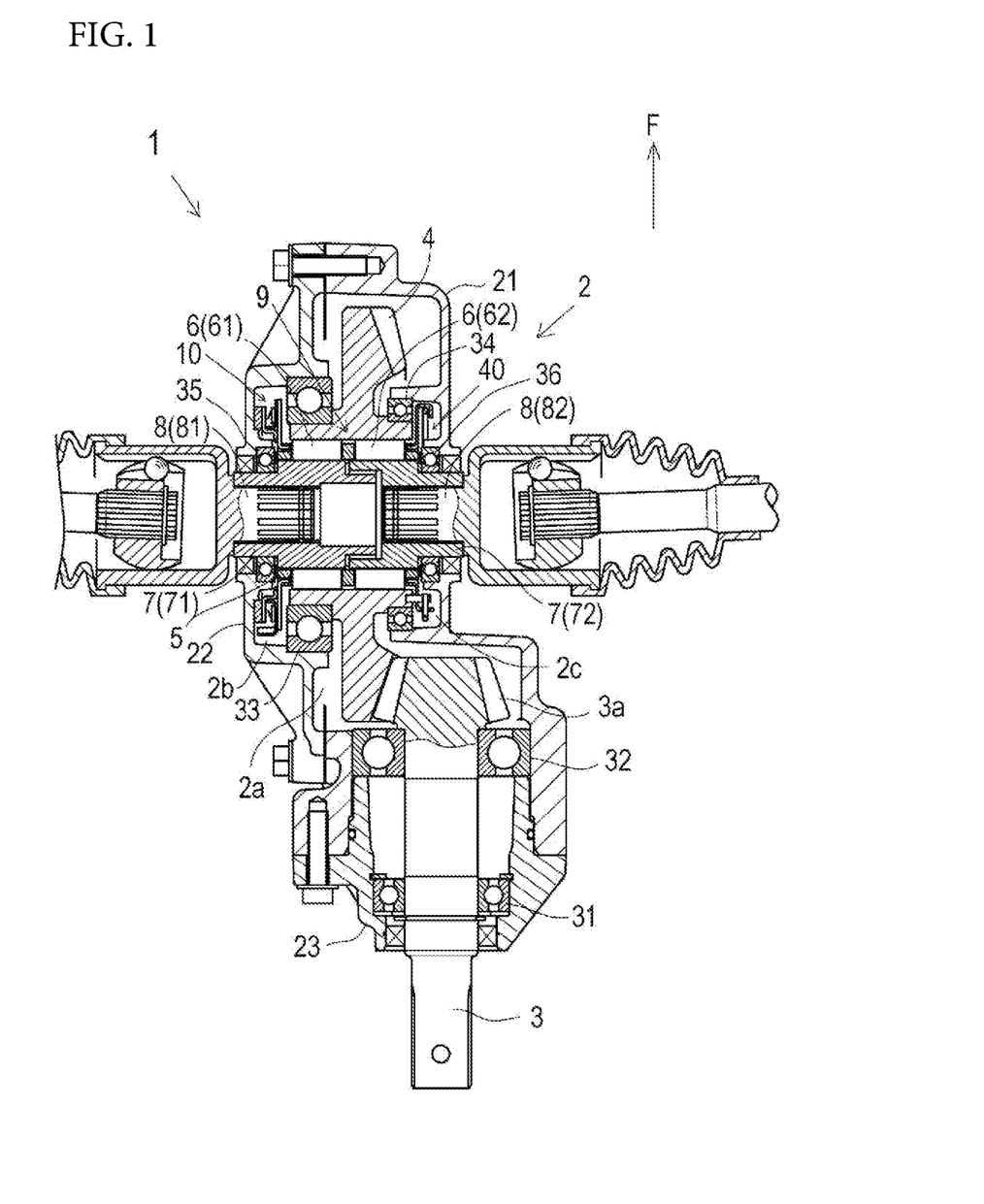
FIG. 1 is a plan cross-sectional view of a transaxle.
Figure 2:
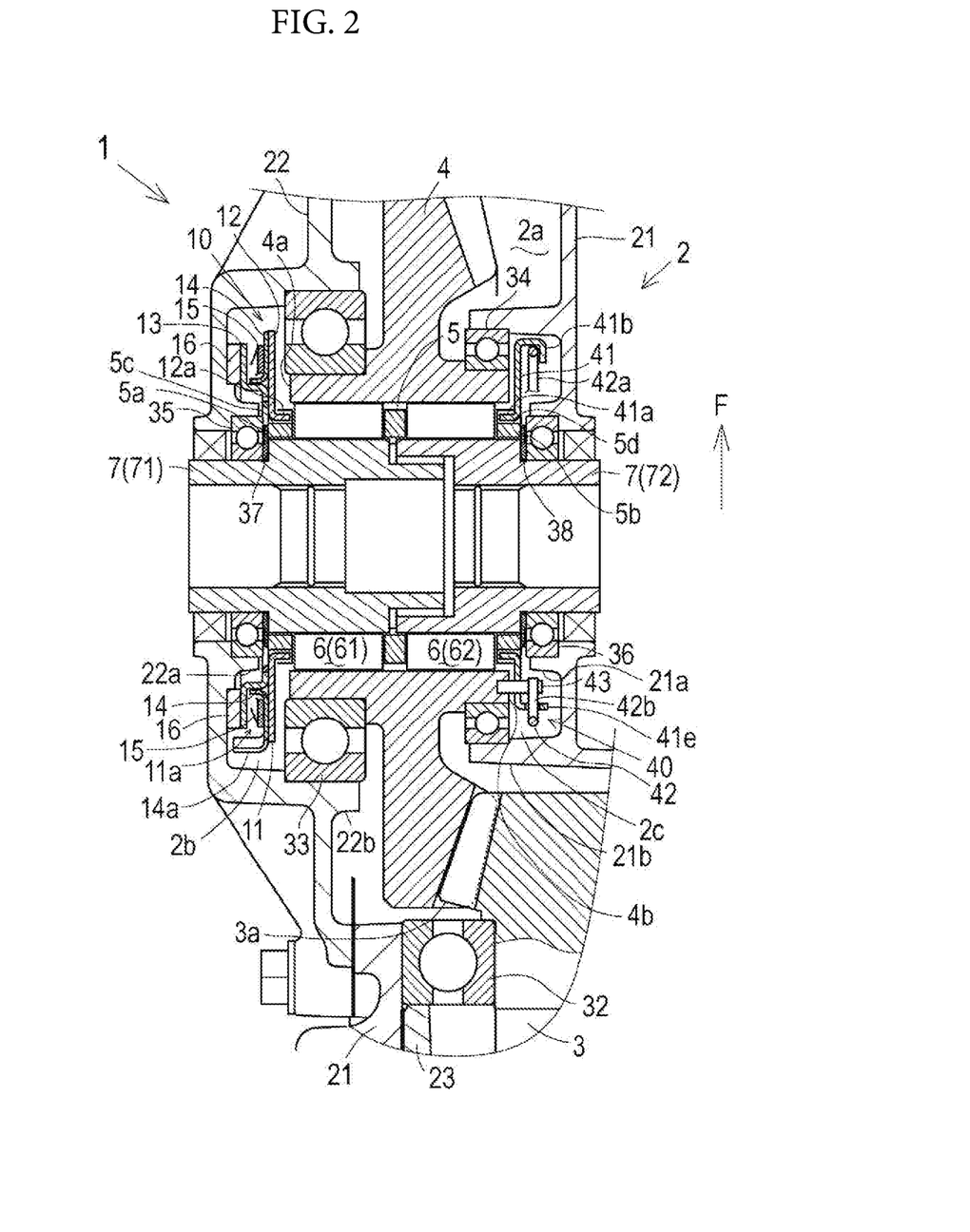
FIG. 2 is a partially enlarged plan cross-sectional view of the transaxle, showing a housing portion for a bidirectional overrunning clutch.

As shown in FIG. 2 and the like, of the first and second spools 71 and 72 pivotally supported by the transaxle case 2, the first axle 81 is spline-fitted to the first spool 71, and the second axle 82 is spline-fitted to the second spool 72. Thus, the transaxle 1 with the first and second axles 81 and 82 being supported is completed as shown in FIG. 1.

A first chamber 2a is formed in the front portion of the transaxle case 2, which is configured by the front portion of the main housing 21 and the side housing 22. Inside this first chamber 2a, the inner end portions of the first and second axles 81 and 82 and the inner end portions of the first and second spools 71 and 72 are disposed, and the first and second axles 81 and 82 are coaxially arranged while the axial centers are arranged perpendicular to the input shaft 3. The inner end portions of the first and second spools 71 and 72 are fitted to each other so as to be relatively rotatable to each other, enabling the differential between the first and second axles 81 and 82.

Hereinafter, the generic term for the first and second axles 81 and 82 is an axle 8, and the generic term for the first and second spools 71 and 72 is a spool 7 (the output member of the transaxle 1). And, the "axial direction" is referred to as the axial direction of the axle 8 and the spool 7. A "radial direction" and a "circumferential direction" are referred to as the radial direction and the circumferential direction with the axial centers of the axle 8 and the spool 7 as the center. Moreover, in the axial direction, a side where the first axle 81 protrudes from the transaxle case 2 (main housing 21) is a "first side," and a side where the second axle 82 protrudes from the transaxle case 2 (the side housing 22) is a "second side."

In the first chamber 2a, a bevel gear 4 having a diameter larger than that of the bevel pinion 3a is arranged, and the rear portion thereof is geared with the bevel pinion 3a. The outer periphery of the bevel gear 4 on the first side is pivotally supported by the inner periphery of the outer boss 22b of the side housing 22 through the bearing 33, and the outer periphery of the bevel gear 4 on the second side is pivotally supported by the inner periphery of the outer boss 21b of the main housing 21 through a bearing 34.

A cylindrical cage 5 arranged concentrically with the axle 8 is disposed between the inner peripheral surface of the bevel gear 4 and the outer peripheral surface of the spool 7. The cage 5 holds a plurality of first rollers 61 interposed between the inner periphery of the bevel gear 4 and the outer peripheral surface of the first spool 71 at one of the right and left side portions thereof and holds a plurality of second rollers 62 interposed between the inner periphery of the bevel gear 4 and the outer peripheral surface of the second spool 72 at the other one of the right and left side portions. Hereinafter, the generic term for the first and second rollers 61 and 62 is a roller 6, and the cage 5 (the cage 5 with the roller 6) holding the roller 6 is referred to as a roller cage 5 in particular.

This roller cage 5 constitutes the bidirectional overrunning clutch 9 interposed between the inner periphery of the bevel gear 4 drivingly connected to the input shaft 3, which is an input member of the transaxle 1, and the spool 7 serving as an output member of the transaxle 1.

A vertical end surface 5a (hereinafter, referred to as a first end surface) of the roller cage 5 on the first side is close to the bearing 35, and a vertical end surface (hereinafter, referred to as a second end surface) 5b of the roller cage 5 on the second side is close to the bearing 36. There is almost no gap between the bearing 35 and the first end surface 5a of the roller cage 5, and a washer 37 is set in this slight gap. And, there is almost no gap between the bearing 36 and the second end surface 5b of the roller cage 5, and a washer 38 is set in this slight gap. In this way, the right-left width of the front portion of the transaxle case 2 in the axial direction of the axle 8 is shortened, and the downsizing of the entire transaxle 1 is realized.

A second chamber 2b extending in the radial direction is formed between the outer periphery of the inner boss 22a and the inner periphery of the outer boss 22b of the side housing 22. The outer end of the second chamber 2b in the axial direction is defined by a vertical wall of the side housing 22, and the inner end of the second chamber 2b in the axial direction is defined by vertical end surfaces of the inner race and the outer race of the ball bearing serving as the bearing 33 and a vertical end surface (hereinafter, referred to as a first end surface) 4a of the bevel gear 4 on the first side. The bearing 33 is disposed so as to partition the first chamber 2a and the second chamber 2b.

Note that the first end surface 5a of the roller cage 5 protrudes outward (first side) from the first end surface 4a of the bevel gear 4 in the axial direction so as to be close to the bearing 35 as previously mentioned, and this protrusion portion of the roller cage 5 to the first end surface 5a and the inner boss 22a define the inner peripheral end of the second chamber 2b.

A third chamber 2c extending in the radial direction is formed between the outer periphery of the inner boss 21a and the inner periphery of the outer boss 21b of the main housing 21. The outer end of the third chamber 2c in the axial direction is defined by a vertical wall of the main housing 21, and the inner end of the third chamber 2c in the axial direction is defined by vertical end surfaces of the inner race and the outer race of the ball bearing serving as the bearing 34 and a vertical end surface (hereinafter, referred to as a second end surface) 4b of the bevel gear 4 on the second side. The bearing 34 is disposed so as to partition the first chamber 2a and the third chamber 2c.

Note that the second end surface 5b of the roller cage 5 protrudes outward (second side) from the second end surface 4b of the bevel gear 4 in the axial direction so as to be close to the bearing 36 as previously mentioned, and this protrusion portion of the roller cage 5 to the second end surface 5b and the inner boss 21a define the inner peripheral end of the third chamber 2c.

A drag mechanism 10 is placed in the second chamber 2b. The drag mechanism 10 includes a holder 11, a switching plate 14, a disc spring 15 interposed between the holder 11 and the switching plate 14, and a thrust plate 16 interposed between the holder 11 and the transaxle case 2 (side housing 22).

The holder 11 is configured by welding and joining an annular inner plate 12 arranged closer to the second side and an annular outer plate 13 arranged closer to the first side. Portions of the inner plate 12 and the outer plate 13 from the intermediate portions in the radial direction to the inner peripheral ends abut each other.

The inner plate 12 is vertically flat from the inner peripheral end to the outer peripheral end. On the other hand, as for the outer plate 13, a portion from the inner peripheral end joined to the inner plate 12 to the intermediate portion in the radial direction is vertically flat, but a portion from the intermediate portion in the radial direction to the outer peripheral end is bent like an L-shape in a cross-sectional view. That is, the intermediate portion in the radial direction extends outward in the axial direction, and the vertical plate portion extends in the radial direction from that outer end in the axial direction to the outer peripheral end. As a result, an annular groove 11a with a substantially U-shape in a cross-sectional view is formed between the portion of the inner plate 12 from the intermediate portion in the radial direction to the outer peripheral end and the portion of the outer plate 13 from the intermediate portion in the radial direction to the outer peripheral end.

A plurality of claws 12a are formed so as to protrude inward in the axial direction from the inner peripheral end of the inner plate 12, and grooves 5c with the same number as the claws 12a for fitting these claws 12a are formed on the outer periphery of the roller cage 5, with a certain width in the axial direction from the first end surface 5a. In this way, by fitting each claw 12a into each groove 5c, the holder 11 is locked to the roller cage 5 so as to be relatively non-rotatable and becomes a rotation member in the drag mechanism 10.

The annular switching plate 14 is fitted into the annular groove 11a from the intermediate portion in the radial direction thereof to the inner peripheral end. Moreover, the inner peripheral end portion of the switching plate 14 is bent inward in the axial direction and is installed additionally to the intermediate portion in the radial direction of the outer plate 13 of the holder 11 extending in the axial direction.

Furthermore, in the groove 11a, the disc spring 15, which is a spring member of the drag mechanism 10, is interposed between a vertical plate portion of the switching plate 14 closely attached to the inner plate 12 and the vertical plate portion of the outer plate 13. This disc spring 15 frictionally presses the switching plate 14 against the inner plate 12.

The disc spring 15 is arranged in the annular groove 11b of the holder 11 in the second chamber 2b so as to be disposed outside the bearing 35 in the radial direction with the axial center of the spool 7 as the center. Since the drag mechanism 10 has the spring member (disc spring 15) arranged in this way, the first end surface 5a of the cage 5 is disposed close to the bearing 35 which pivotally supports the first spool 71 to the transaxle case 2 (the side housing 22) as previously mentioned. Thus, the transaxle 1 is shortened in the axial direction of the spool 7 and downsized.

Moreover, the inner plate 12 serves as a rotation member of the drag mechanism 10, which is locked to the cage 5 so as to be relatively non-rotatable by fitting the claws 12a into the grooves 5c opening at the first end surface 5a of the cage 5, and the holder 11, in which the annular groove 11a for holding the switching plate 14 as a resistance member and the disc spring 15 as a spring member is formed, is configured by joining the inner plate 12 and the outer plate 13 by welding.

With the above configuration, the placement position of the disc spring 15 is secured on the outer side in the radial direction of the bearing 35. Furthermore, the inner plate 12, which is a rotation member locked to the cage 5 so as to be relatively non-rotatable, also serves as the holder 11 for holding the disc spring 15 and the switching plate 14 in the annular groove 11b so that the number of parts is reduced, leading to cost reduction.

Note that the thrust plate 16 made of resin or the like is interposed between the vertical plate portion of the holder 11 to the outer peripheral end of the outer plate 13 and a vertical wall portion between the inner boss 22a and the outer boss 22b of the side housing 22, thereby supporting the holder 11 so as not to be inclined outward in the axial direction (first side).

A plurality of claws 14a are formed on the outer peripheral end of the switching plate 14 so as to protrude outward in the radial direction from the outer peripheral end of the holder 11 (i.e., the inner plate 12 and the outer plate 13).

Figure 3:
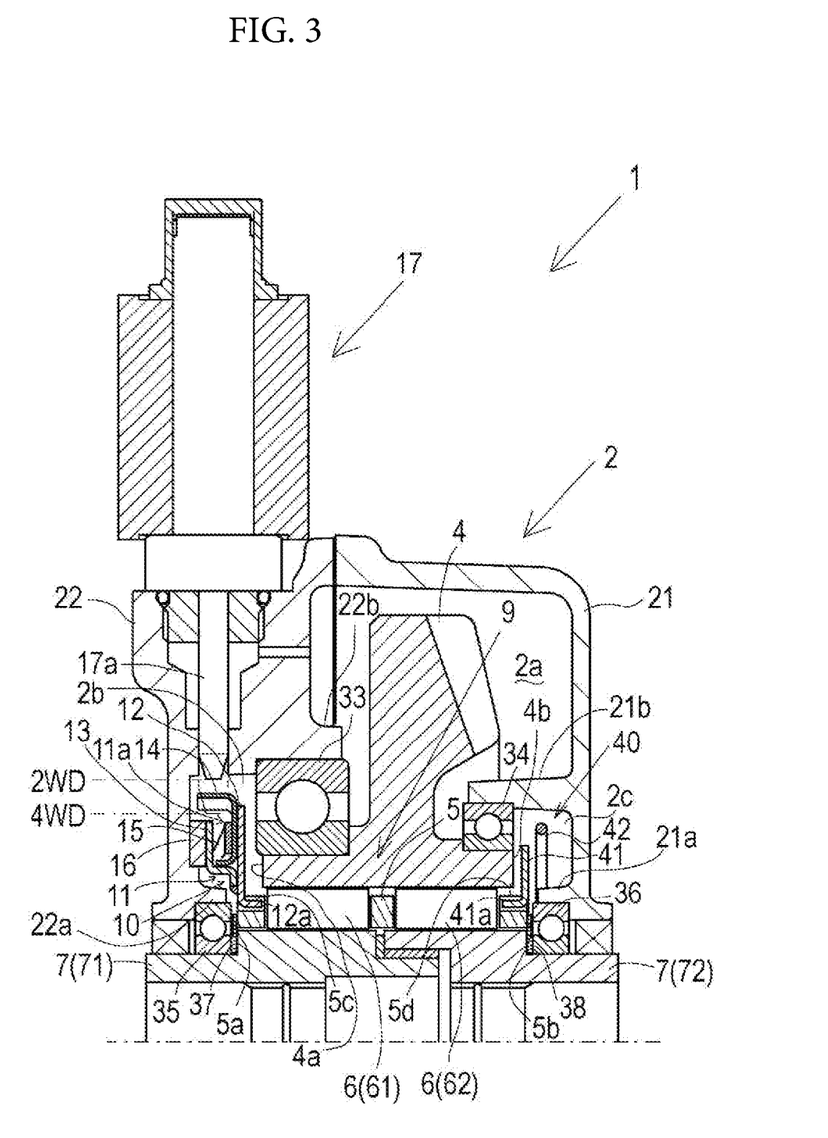
FIG. 3 is a partially enlarged rear cross-sectional view of the transaxle, showing portions where the bidirectional overrunning clutch, a driving mode switching device, and a wedging prevention mechanism are disposed.

For these claws 14a of the switching plate 14, a solenoid 17 as a two-wheel/four-wheel operation mode switching device is attached to the side housing 22 as shown in FIG. 3. The solenoid 17 has a telescopic pin 17a which is movable back and forth toward the drag mechanism 10 in the second chamber 2b.

As indicated by a solid line in FIG. 3, the position at which the telescopic pin 17a is being retracted outward in the radial direction than the outer peripheral end of the switching plate 14 is a two-wheel drive mode position of the telescopic pin 17a (hereinafter, referred to as a "2WD position"). In FIG. 3, this position is denoted by the reference sign 2WD.

Figure 4A:
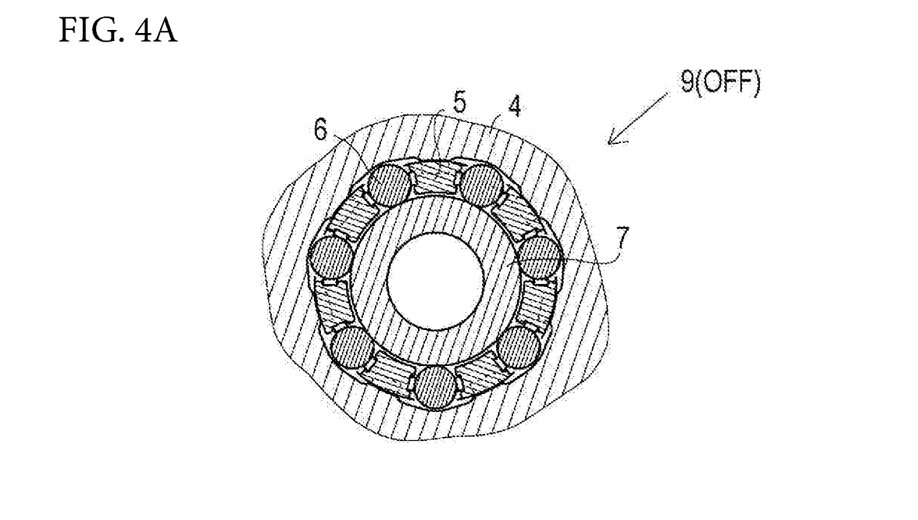
FIG. 4A is a side cross-sectional view of the disengaged bidirectional overrunning clutch as seen in the axial direction of the output shaft of the transaxle.

When the telescopic pin 17a is at the 2WD position, the rotation of the switching plate 14 is not limited by the telescopic pin 17a so that the switching plate 14 being pressed against the holder 11 by the disc spring 15 can co-rotate with the holder 11 which rotates together with the roller cage 5. That is, since the rotational resistance by the frictional force does not act between the holder 11 and the switching plate 14, the roller 6 is not held between the bevel gear 4 and the first and second spools 71 and 72 as shown in FIG. 4A, the roller cage 5 idles between the bevel gear 4 and the first and second spools 71 and 72 so that the rotational force of the input shaft 3 is not being transmitted to the first and second axles 81 and 82. That is, the bidirectional overrunning clutch 9 is being disengaged (the state indicated by the reference sign 9 (OFF) in FIG. 4A).

As indicated by the phantom line in FIG. 3, a position at which the telescopic pin 17a advances inward than the outer peripheral end of the switching plate 14 through the gap in the circumferential direction between the claws 14a and the claws 14a is an automatic four-wheel drive mode position of the telescopic pin 17a (hereinafter, referred to as an "automatic 4WD position"). In FIG. 3, this position is denoted by the reference sign 4WD.

When the telescopic pin 17a is at the automatic 4WD position, the rotation of the switching plate 14 is limited by the telescopic pin 17a, and the drag mechanism 10 functions. As a result, the frictional force generated between the switching plate 14 as a resistance member and the holder 11 by rotating the holder 11 together with the cage 5 becomes the rotational resistance for making the bidirectional overrunning clutch 9 be engaged and is applied to the cage 5. That is, the telescopic pin 17a at the automatic 4WD position is a rotation limiting member for limiting the rotation of the switching plate 14 as a resistance member.

Figure 5A:
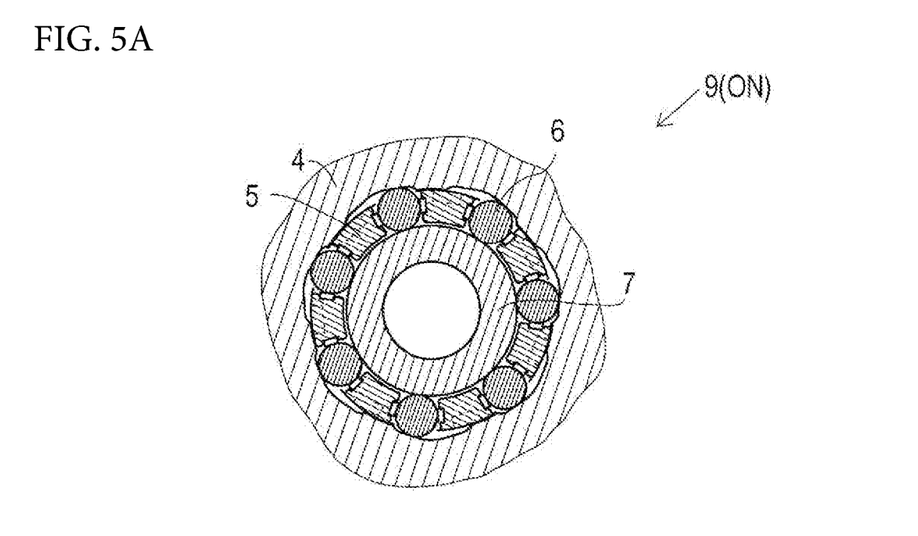
FIG. 5A is a side cross-sectional view of the engaged bidirectional overrunning clutch as seen in the axial direction of the output shaft of the transaxle.

Even in the automatic 4WD mode, the roller cage 5 normally co-rotates with the rotation of the axle 8 and idles with respect to the bevel gear 4, and the bidirectional overrunning clutch 9 is being disengaged so that the vehicle can travel with improved fuel efficiency. However, since the rotational resistance is applied to the roller cage 5, as soon as the wheels slip, the traveling speed of the vehicle decreases, and the rotational speed of the axle 8 drops, the rotational speed of the roller cage 5 drops as a result, and the rotation of the roller cage 5 becomes relatively slower than the bevel gear 4. Then, the roller 6 is being held between the bevel gear 4 and the spool 7 as shown in FIG. 5A, that is, the bidirectional overrunning clutch 9 is engaged (the state indicated by the reference sign 9 (ON) in FIG. 5A), thereby transmitting the driving force of the input shaft 3 to the axle 8 (the first and second axles 81 and 82). For example, this driving force can be applied to a wheel being caught in mud, and the vehicle can quickly escape from the mud.

In the third chamber 2c, a wedging prevention mechanism 40 is placed as shown in FIGS. 2 to 5B. The wedging prevention mechanism 40 is constituted by combining a spring holder 41 as a rotation member which is locked to the cage 5 so as to be relatively non-rotatable, a spring 42, and a pair of spring lock pins 43.

The spring holder 41 is a discoid annular member and formed such that a plurality (seven at equal intervals in the present embodiment) of claws 41a protrude inward in the axial direction from the inner peripheral end thereof. On the other hand, at the outer periphery of the roller cage 5 with a certain width in the axial direction from the second end surface 5b, grooves 5d with the same number as the claws 41a for fitting these claws 41a are formed.

Note that these grooves 5d may be symmetrical with the grooves 5c into which the claws 12a of the holder 11 (inner plate 12) in the drag mechanism 10 are fitted, and the claws 12a of the holder 11 of the drag mechanism 10 arranged in the first chamber 2b and the claws 41a of the spring holder 41 of the wedging prevention mechanism 40 arranged in the second chamber 2c may be fitted whichever of the grooves 5c and 5d of the roller 5 arranged on the first side or the second side in the axial direction.

By fitting each claw 41a into each groove 5d in this way, the spring holder 41 is locked to the roller cage 5 so as to be relatively non-rotatable.

The spring 42 is made of a flexible rod-like member such as metal. Most of the spring 42 is annularly formed by bending the rod-like member, and this is an annular portion 42a of the spring 42. This annular portion 42a is disposed along the outer peripheral edge of the spring holder 41. A plurality (three at equal intervals in the present embodiment) of U-shaped bent spring holding claws 41b are formed to extend from the outer peripheral edge of the spring holder 41, and the annular portion 42a of the spring 42, which extend along the outer peripheral edge of the spring holder 41, is held by the spring holding claws 41b. The annular portion 42a is held by these spring holding claws 41b so that the spring 42 is a compression spring. That is, the annular portion 42a of the spring 42 has a spring force potentially trying to expand in the centrifugal direction.

Both end portions of the annular portion 42a of the spring 42 are close to each other with a constant interval, and both end portions are bent inward in the radial direction to form a pair of adjacent spring end portions 42b. The spring force of the spring 42 held by the spring holding claws 41b acts in a direction in which a spring end portion 42b and a spring end portion 42b move away from each other.

As for a discoid portion of the spring holder 41 being fixed to the roller cage 5 by fitting the claws 41a into the grooves 5b, the pair of spring lock pins 43, which extend vertically along the vertical end surface of the bevel gear 4 facing the third chamber 2c, are implanted in the bevel gear 4 in the third chamber 2c. The pair of spring lock pins 43 protrude in the axial direction from the second end surface 4b of the bevel gear 4 into the third chamber 2c.

An elongated hole 41c is formed along the circumferential direction in the discoid portion of the spring holder 41, and the pair of spring lock pins 43 are inserted into this elongated hole 41c. The central portion of the elongated hole 41c in the circumferential direction is connected to an opening portion 41d having a certain width in the circumferential direction at the outer peripheral edge of the spring holder 41, and the pair of spring end portions 42b are inserted into the elongated hole 41c through this opening portion 41d.

In the elongated hole 41c, the pair of spring end portions 42b are disposed between the spring lock pin 43 and the spring lock pin 43. Meanwhile, the opening portion 41d is formed by bending a part of the outer peripheral edge of the spring holder 41 in the axial direction, and this bent portion is a spring pressing portion 41e. That is, a portion between the annular portion 42a and each spring end portion 42b of the spring 42 can abut the spring pressing portion 41e by relative rotation of the roller cage 5 and the spring holder 41 with respect to the bevel gear 4.

Figure 4B:
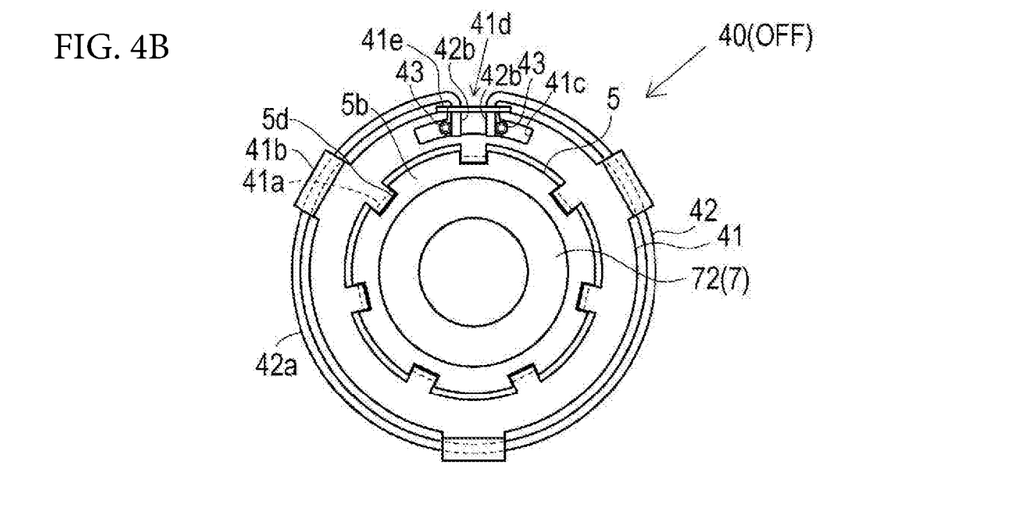
FIG. 4B is a side view of the wedging prevention mechanism mounted on the disengaged bidirectional overrunning clutch as seen in the axial direction of the output shaft of the transaxle.

As indicated by the reference sign 9 (OFF) in FIG. 4A, when the bidirectional overrunning clutch 9 is disengaged, as previously mentioned, the spring force, which acts in the centrifugal direction of the spring 42 being held by the spring holding portion 41b, presses the spring end portion 42a against the spring lock pin 43 and the spring end portion 42b against the spring lock pin 44 in the elongated hole 41c as shown in FIG. 4B. At this time, the spring pressing portion 41e is separated from the spring 42 or abuts the spring 42 without affecting the pressing of each spring end portion 42b against each spring lock pin 44. In FIG. 4B, the state of the wedging prevention mechanism 40 while the bidirectional overrunning clutch 9 is being disengaged is denoted by the reference sign 40 (OFF).

Figure 5B:
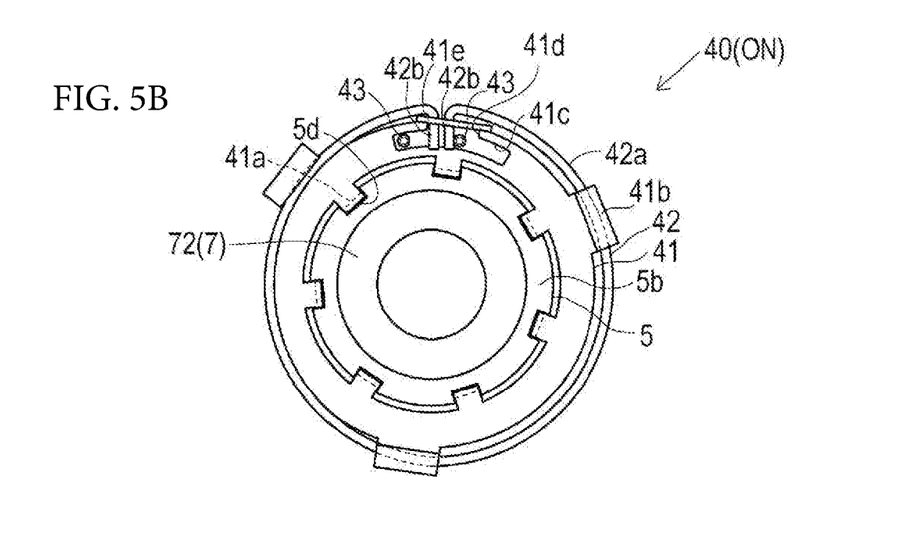
FIG. 5B is a side view of the wedging prevention mechanism mounted on the engaged bidirectional overrunning clutch as seen in the axial direction of the output shaft of the transaxle.

When the bidirectional overrunning clutch 9 is being engaged as indicated by the reference sign 9 (ON) in FIG. 5A, as previously mentioned, due to the relative rotational delay of the roller cage 5 with respect to the bevel gear 4, one spring end portion 42b is pressed by the spring pressing portion 41e of the spring holder 41 and approaches the other spring end portion 42b as indicated by the reference sign 40 (ON) in FIG. 5B. Meanwhile, the other spring end portion 42b continues to be pressed against the spring lock pin 44. Therefore, a gap in the circumferential direction between the one spring end portion 42b and the other spring end portion 42b becomes narrower than that at the time of the bidirectional overrunning clutch 9 being engaged. In this way, as the gap narrows, the spring force of the spring 42 acting in the circumferential direction further increases.

By the spring force of the spring 41 thus increased, the roller cage 5 at the time of the bidirectional overrunning clutch 9 being engaged is urged to the relative rotational position with respect to the bevel gear 4 at the time of the bidirectional overrunning clutch 9 being disengaged. Therefore, as soon as the rotational speeds of the wheels and the axle 8 recover, the bidirectional overrunning clutch 9 quickly returns to be disengaged as shown in FIG. 4A by this urging force, and a circumstance, in which the roller 6 of the roller cage 5 is sandwiched between the bevel gear 4 and the spool 7 (the first and second spools 71 and 72) and does not move so that the bidirectional overrunning clutch 9 does not return to be disengaged, is prevented.

The transaxle 1 shown in FIGS. 1 to 5B is configured as described above.

Figure 6:
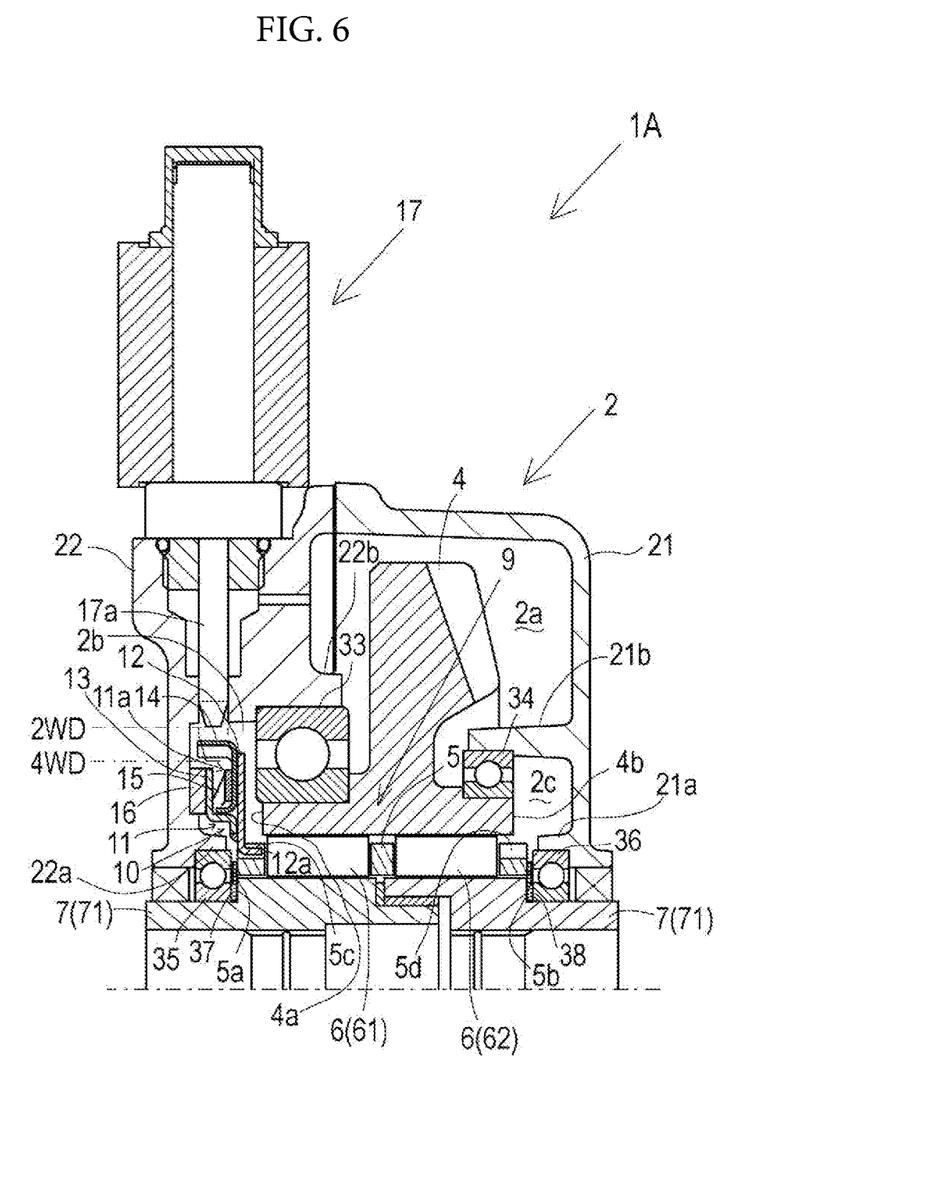
FIG. 6 is a partially enlarged rear cross-sectional view of a transaxle according to another embodiment, which is configured without a wedging prevention mechanism.

FIG. 6 shows an alternative transaxle 1A having the same structure as the transaxle 1 except that the wedging prevention mechanism 40 is eliminated.

Figure 7:
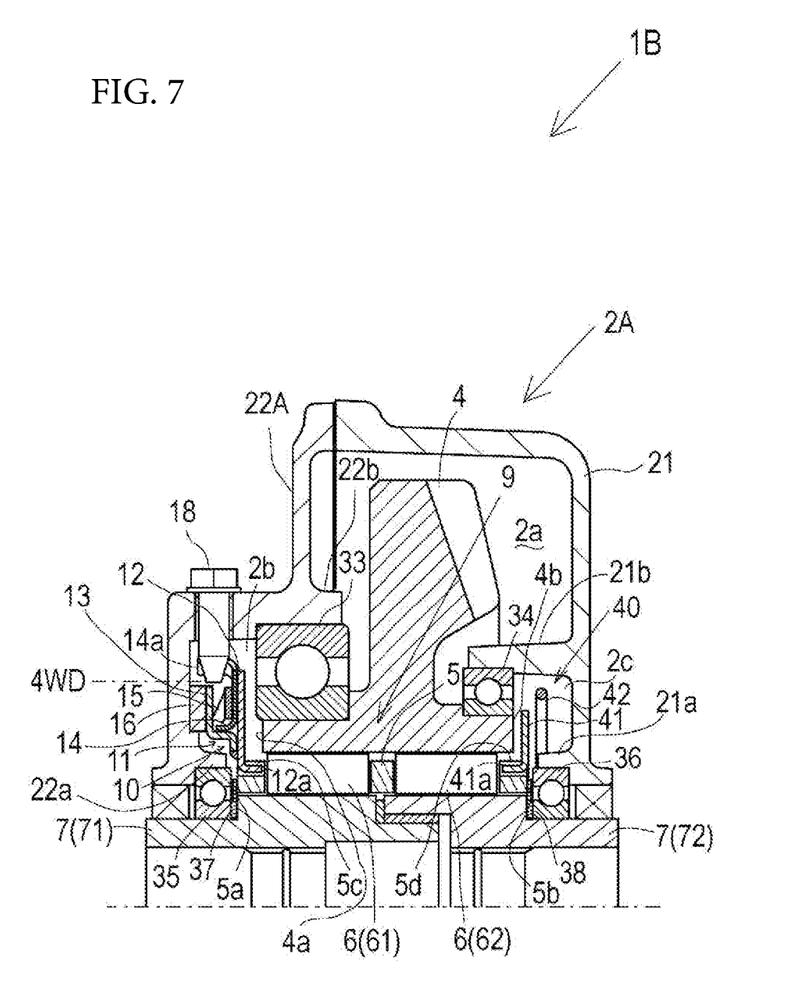
FIG. 7 is a partially enlarged rear cross-sectional view of a transaxle according to still another embodiment, which is configured to be set only in an automatic four-wheel drive mode.

The transaxle 1B shown in FIG. 7 uses a stopper pin 18 for causing only the automatic 4WD mode to appear, instead of the solenoid 17 as the 2WD/automatic 4WD mode switching device and is the same as the transaxle 1 except that a transaxle case 2A is configured by using a side housing 22A configured by attaching this stopper pin 18 thereto.

In the third chamber 2c, the tip end portion of the stopper pin 18 is arranged at the same position as the automatic 4WD position of the telescopic pin 17a of the solenoid 17 shown in FIG. 3 (position indicated by the reference sign 4WD in FIG. 7), and the frictional force as the resistance force against the rotation of the holder 11 rotatable together with the roller cage 5 is generated by limiting the rotation of the switching plate 14 with the stopper pin 18. That is, a four-wheel drive vehicle provided with the transaxle 1B as the front transaxle is always in a 4WD state in which the rotational force of the input shaft 3 is transmitted to the axle 8 except when the rotational speed of the wheels drivingly connected to the axle 8 drops and the bidirectional overrunning clutch 9 is disengaged.

What is claimed is:

1. A transaxle comprising:
   a transaxle case;
   an input member supported within the transaxle case;
   a gear drivingly connected to the input member within the transaxle case;
   an output member supported within the transaxle case and arranged on an inner peripheral side of the gear concentrically with the gear;
   a cage with a roller as a bidirectional overrunning clutch interposed between an inner periphery of the gear and an outer periphery of the output member within the transaxle case; and
   a drag mechanism provided within the transaxle case and structured to apply rotational resistance to the cage to make the bidirectional overrunning clutch be engaged,
   wherein the cage has a first end and a second end, which oppose each other in an axial direction of the output member,
   the first end of the cage is close to a first bearing which directly contacts and pivotally supports the output member to the transaxle case,
   the second end of the cage is close to a second bearing which is arranged on a side opposite to the first bearing in the axial direction, directly contacts and pivotally supports the output member to the transaxle case,
   the drag mechanism comprises:
      a rotation member which includes an outer plate and an inner plate at the first end of the cage, and which is locked to the cage at the first end of the cage so as to be relatively non-rotatable; and
      a spring member which is provided between the outer plate and the inner plate, and which is structured to apply the rotational resistance to the rotation member,
   in the transaxle case, a first concave space is defined by a first inner wall of the transaxle case that supports an outer race of the first bearing such that the drag mechanism is exposed to the inner wall, and
   the spring member is disposed in the first concave space,
   in the transaxle case, a wedging prevention mechanism for applying an urging force for restoring the engaged bidirectional overrunning clutch to be disengaged is disposed,
   the wedging prevention mechanism comprises:
      a second rotation member which is locked to the cage at the second end of the cage so as to be relatively non-rotatable, and
      a second spring member for applying the urging force to the second rotation member.

2. The transaxle according to claim 1, wherein
   the rotation member of the drag mechanism is a holder having an annular groove opened outward in a radial direction,
   in the annular groove, the spring member and a resistance member pressed against the holder by the spring member are disposed,
   a rotation limiting member is fixed to the transaxle case, and
   a frictional force generated between the resistance member and the holder becomes the rotational resistance by rotating the holder together with the cage while rotation of the resistance member is limited by the rotation limiting member.

3. The transaxle according to claim 1, wherein
   in the transaxle case, a second concave space is defined by a second inner wall of the transaxle case that supports an outer race of the second bearing, and
   the second spring member is disposed in the second concave space.

* * * * *